(12) United States Patent
Fu et al.

(10) Patent No.: US 9,143,902 B2
(45) Date of Patent: *Sep. 22, 2015

(54) METHOD AND APPARATUS FOR CREATING A COMMUNICATION GROUP USING AN ADDRESS BOOK

(71) Applicant: BLACKBERRY LIMITED, Waterloo (CA)

(72) Inventors: Runbo Fu, Kanata (CA); Wen Zhao, Kanata (CA); Xin Jin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,771

(22) Filed: Oct. 23, 2014

(65) Prior Publication Data

US 2015/0045081 A1 Feb. 12, 2015

Related U.S. Application Data

(63) Continuation of application No. 10/884,937, filed on Oct. 27, 2004, now Pat. No. 8,909,277.

(30) Foreign Application Priority Data

Jul. 7, 2004 (EP) .................................. 04103227

(51) Int. Cl.
*H04W 4/08* (2009.01)
*H04W 4/10* (2009.01)
*H04M 1/725* (2006.01)
*H04W 8/18* (2009.01)
(Continued)

(52) U.S. Cl.
CPC ............ *H04W 4/08* (2013.01); *H04M 1/72552* (2013.01); *H04W 4/10* (2013.01); *H04W 8/183* (2013.01); *H04W 8/186* (2013.01);
(Continued)

(58) Field of Classification Search
CPC ..... H04W 76/005; H04W 4/10; H04W 84/08; H04W 4/08; H04L 29/06442
See application file for complete search history.

(56) References Cited

U.S. PATENT DOCUMENTS

| 6,363,258 B1 | 3/2002 | Przelomiec et al. |
| 6,771,756 B1 | 8/2004 | Chou et al. |

(Continued)

FOREIGN PATENT DOCUMENTS

| CA | 2444406 A1 | 10/2002 |
| CA | 2499361 A1 | 4/2004 |
| WO | 2005025255 A1 | 3/2005 |

OTHER PUBLICATIONS

Push to Talk over Cellular, Technical Specification, (Comneon et al) Jun. 2004 "List Management and Do-Not-Disturb" V2.06 sections 5 and 7 and "User Requirements" V2.6.0.

*Primary Examiner* — Andrew Wendell
(74) *Attorney, Agent, or Firm* — Ridout & Maybee LLP (57) ABSTRACT

A method and apparatus for creating a communication group for a given type of communication using a mobile station for initiating communication sessions of the given type among mobile stations are disclosed. A group definition for determining members of the new communication group is composed from one or more contacts from the electronic address book such as by selecting from the address book using the mobile station. The group definition may include logical operators to define the combination of contacts. A name may be specified for the new group. The assembly of the list of members may be performed by the mobile station, a communication network server for maintaining groups (e.g. a Group and List Management Server (GLMS)) or an email server.

38 Claims, 6 Drawing Sheets

(51) Int. Cl.
 H04W 8/26 (2009.01)
 H04W 76/00 (2009.01)
 H04W 76/02 (2009.01)
 H04W 84/04 (2009.01)
 H04W 88/06 (2009.01)

(52) U.S. Cl.
 CPC .............. *H04W 8/18* (2013.01); *H04W 8/26* (2013.01); *H04W 76/005* (2013.01); *H04W 76/02* (2013.01); *H04W 84/042* (2013.01); *H04W 88/06* (2013.01)

(56) References Cited

U.S. PATENT DOCUMENTS

| | | |
|---|---|---|
| 8,909,277 B2 * | 12/2014 | Fu et al. ................ 455/519 |
| 2003/0211859 A1 | 11/2003 | Chen et al. |
| 2004/0121791 A1 | 6/2004 | Marick et al. |
| 2004/0185890 A1 | 9/2004 | Drozt et al. |
| 2004/0203977 A1 | 10/2004 | Kennedy |
| 2005/0026558 A1 | 2/2005 | Stura et al. |
| 2005/0054361 A1 | 3/2005 | Turcanu et al. |

* cited by examiner

METHOD AND APPARATUS FOR CREATING A COMMUNICATION GROUP USING AN ADDRESS BOOK

CROSS-REFERENCE TO RELATED APPLICATIONS

This application is a continuation of U.S. patent application Ser. No. 10/884,937, filed on Oct. 27, 2004, and claims priority from European Patent Application No. 04103227, filed Jul. 7, 2004, both of which are hereby incorporated by reference in their entireties.

FIELD OF THE INVENTION

The present invention relates to a method and apparatus for creating a communication group (e.g. a push-to-talk group, an electronic instant messaging group, or a conference call group) using an address book including using aliases.

BACKGROUND OF THE INVENTION

A wireless communication device, such as a cellular telephone or mobile station, is capable of making and receiving voice calls and/or sending and receiving data over a wireless communication network. Recent developments have given such mobile stations the ability to communicate in "push-to-talk" (PTT) modes using Push-to-talk over Cellular (PoC) technology. PoC communication utilizes Voice-over-IP (VoIP) techniques which involve the communication of data packets carrying voice information. PoC communication is adapted for one-to-one talks or group talks which are session-based.

The end user of a mobile station may send an "invitation" for PoC communication to other potential "participants" who may "accept" or ignore the invitation. When an invitation is accepted, a PoC session is created between the two participants. Further acceptances of the invitation will expand the session into a group session having more than two participants.

There are two common ways to create PoC groups for PoC services: 1) predefining a PoC group by a PoC service provider or by a Web-based application tool and 2) defining a group at use time by a user. The predefined manner is inflexible while the use time definition manner is flexible but may be time consuming—the initiating user typically must invite prospective group members individually to the new group. It takes a significant time to create a large group in this manner.

As well, individual PoC groups are typically identified by a group number. When a user is a member of more than one group, it is difficult for a user to remember the purpose of each group of which the user is a member by just looking at those numbers.

A solution to one or more of these shortcomings is therefore desired.

SUMMARY OF THE INVENTION

Methods and apparatus for facilitating group creation for Push-to-talk over Cellular (PoC) group communication sessions, instant messaging sessions, chat and other communications are described herein.

In one aspect, there is provided a method of creating a Push-to-Talk over Cellular (PoC) group for initiating PoC communication sessions among mobile stations. The method comprises defining a group definition from which to determine a PoC group list of members for the PoC group and assembling the PoC group list of members in accordance with the group definition for creating the PoC group.

The group definition may comprise at least one identifier with each identifier identifying one of a contact, a contact group (alias), or an existing PoC group from an electronic address book of contacts or PoC group lists The group definition is then used to assemble the PoC group list of members.

The group definition may comprise at least two identifiers and at least one logical operator for combining respective contacts and/or PoC groups identified by said at least two identifiers.

The PoC group list of members may be maintained in a memory of a communication network server adapted for maintaining PoC groups. As such, the PoC group list of members may be maintained for one of: (i) a predetermined period; (ii) removal by a user of the PoC group list; and (iii) a single PoC communication session.

Once a PoC group is created, a notification of the creation of the PoC Group may be received at a mobile station.

Once a PoC group is created, a PoC communication session using the PoC group list of members may be initiated.

In one embodiment, the steps of defining and assembling are performed by a one of the mobile stations. In such a case, the method may include at least one of: storing the PoC group list of members to a memory of the one of the mobile stations; and uploading the PoC group list of members to a communication network server adapted to maintain PoC Groups.

In a further embodiment, the step of assembling may be performed by a communication network server adapted to maintain PoC Groups, the server receiving the group definition from a one of the mobile stations. In such a case, the group definition may include at least one identifier, each identifier identifying one of a contact, a contact group (alias), or an existing PoC group from an electronic address book of contacts or existing PoC lists. The group definition is then used to assemble the PoC group list of members and the method may comprise obtaining information for particular contacts from an electronic mail (email) server.

In a further embodiment, the step of assembling is performed by an electronic mail (email) server of a communication network, said email server receiving the group definition from a one of the mobile stations. In such a case, the group definition may include at least one identifier, each identifier identifying one of a contact, a contact group (alias), or an existing PoC group from an electronic address book of contacts or existing PoC lists. The group definition is used to assemble the PoC group list of members and the method comprises obtaining information for particular contacts from an address book coupled to the electronic mail (email) server. In accordance with this embodiment, the method may include uploading the PoC group list of members to a communication network server adapted to maintain PoC Groups.

In accordance with a feature of the method aspect, the method preferably comprises excluding from the PoC group list of members at least one of duplicate members; and members having no PoC communication capabilities.

A communication other than a PoC communication using the PoC group list of members may be initiated.

As well, the group definition may comprise a name for naming the PoC group to be created and the method thus comprise naming the PoC group using the name.

In a further aspect of the invention, there is provided a mobile station for creating a Push-to-Talk over Cellular (PoC) group for initiating PoC communication sessions. The mobile station comprises a user interface for composing a group definition from which to determine a PoC group list of members for the PoC group and a communications subsystem for communicating the group definition to a server for assembling the PoC group list of members in accordance with the group definition to create the PoC group.

In a further aspect there is provided a mobile station for creating a Push-to-Talk over Cellular (PoC) group for initiating PoC communication sessions, the mobile station comprising: a user interface for composing a group definition from which to determine a PoC group list of members for the PoC group; a user list determination unit for assembling the PoC group list of members in accordance with the group definition for creating the PoC group; and a communications system for communicating the PoC group list of members in accordance with the group definition to a server adapted to enable the PoC group.

In accordance with another aspect of the invention, there is a communication network server for creating a Push-to-Talk over Cellular (PoC) group for initiating PoC communication sessions among mobile stations, the server comprising: a communications system for receiving a group definition from a mobile station to determine a PoC group list of members for the PoC group; and a user list determination unit for assembling the PoC group list of members in accordance with the group definition for creating the PoC group.

In one embodiment, the communication network server may comprise an electronic mail (email) server wherein the communications system communicates the PoC group list of members in accordance with the group definition to a second communication network server for maintaining PoC groups to enable PoC group communications.

In accordance with another embodiment, the communication network server includes a PoC group construction unit for assembling the PoC group from the PoC group list of members to enable PoC group communications.

The communication network server may include a memory for maintaining the PoC group list of members. The PoC group list of members may be maintained for one of: (i) a predetermined period; (ii) removal by a user of the PoC group list; and (iii) a single PoC communication session.

The group definition may include at least one identifier, each identifier identifying one of a contact, a contact group (alias), or an existing PoC group from an electronic address book of contacts or existing PoC lists. The group definition is then used to create the PoC group list of members and the communication system obtains information for particular contacts from an electronic mail (email) server.

As well, the group definition may comprise a name for naming the PoC group to be created; and wherein the communication network server names said PoC group using the name.

These and other aspects including one or more computer program product aspects will be apparent to those of ordinary skill in the art.

BRIEF DESCRIPTION OF THE DRAWINGS

In order that the invention may be readily understood, embodiments of the invention are illustrated by way of examples in the accompanying drawings, in which.

DETAILED DESCRIPTION

To facilitate more convenient communications, users of electronic communication devices including wireless communication devices find it helpful to define contact information and other particulars for contacts with which they communicate (whether by voice or data means). This contact information is typically stored in an electronic address book communicatively coupled to the device. When initiating a communication, the address book may be reviewed and contact data retrieved to invoke the communication. An individual entry or contact in the address book comprises either (i) contact information for a single individual person or entity, such as a business, institution, organization, etc.; or (b) a contact group comprising a list of contacts from the address book that typically shares an attribute. For example, a user may desire to group certain friends into an instant messaging group or group some business colleagues into a conference call group, etc. Within an enterprise context, management personnel at one location may be grouped to define a contact group and staff personnel grouped to define a separate contact group. Together, the staff and management contact groups may be used to create a contact group for communicating with each member of enterprise at the particular location. Thus a contact group may be created from contacts for individual persons or entities and/or from one or more other contact groups. To facilitate easier use of contact groups, each contact group is usually given a respective name or alias. A contact group of friends may be given the name "Friends". "Friends" is an alias and a contact in the address book.

Devices may have access to a plurality of address books such as a personal address book resident on the device and an enterprise address book resident on a server with which the device may communicate.

In accordance with an embodiment of the invention, to create a PoC group for PoC services, a pre-existing aliased contact group, such as "Ottawa Office", in an electronic address book coupled to a communications device, can be used to facilitate the process to invite users to a PoC group session. Aliased groups and regular individual address book entries can be combined to create a desired new group. In addition, groups can be combined using logical operators such as "Ottawa Office"—"Ottawa IT" to exclude the group "Ottawa IT" from "Ottawa Office", when defining a new group. When assembling a list for a new group, individual users who do not support the type of service to which the new group relates are preferably automatically excluded from the list.

For example, assume two of the individuals in the group "Ottawa Office" do not have PoC-enabled devices. These two users are preferably automatically excluded from a new PoC group created using the aliased group "Ottawa Office" from an address book.

The list of members of the new group can be assembled in a variety of manners in accordance with embodiments of the invention. For example, in accordance with a first embodiment, the list may be assembled at the mobile station. In accordance with further embodiments, it may be assembled at an enterprise server (e.g. email server) or a server of a communication network adapted for maintaining groups (e.g. a GLMS server) or other network nodes. Accordingly, an advantage facilitated by the present invention may include the reduction of processing power and storage requirements of the mobile device to perform such tasks.

In one embodiment, when a PoC group is created by a user, the network server is notified with the group name and all the member information within that group. The network caches the PoC group information/property for a certain period of time or may retain it permanently. In another embodiment, information about a PoC group created at a server can be downloaded to a PoC enabled device of all members of that group. Users can use that group information to facilitate other means of communications, for instance, sending out chat, instant messaging or email messages among the members of the PoC group during or out of group calls. A user may choose not to participate in a PoC group call but may still be able to receive all text messages.

Persons of ordinary skill in the art will appreciate that in accordance with the techniques disclosed herein other types of communication groups, such as an instant messaging group, a chat group and a conference call group may be similarly defined.

The group can be configured for either one purpose only, or multiple purposes. For example, "Ottawa Office" can be configured only as an email service group. When a user tries to create a PoC group using "Ottawa Office", the user may get a warning that PoC group creation from this alias is prohibited. Conversely, "Ottawa Hardware" can be configured for both PoC and email. If a user sends an email to "Ottawa Hardware", each member of "Ottawa Hardware" will receive this email. If a user starts a PoC group call to "Ottawa Hardware", each member of "Ottawa Hardware" will be in the PoC group call, once the PoC group is created.

Figure 1:
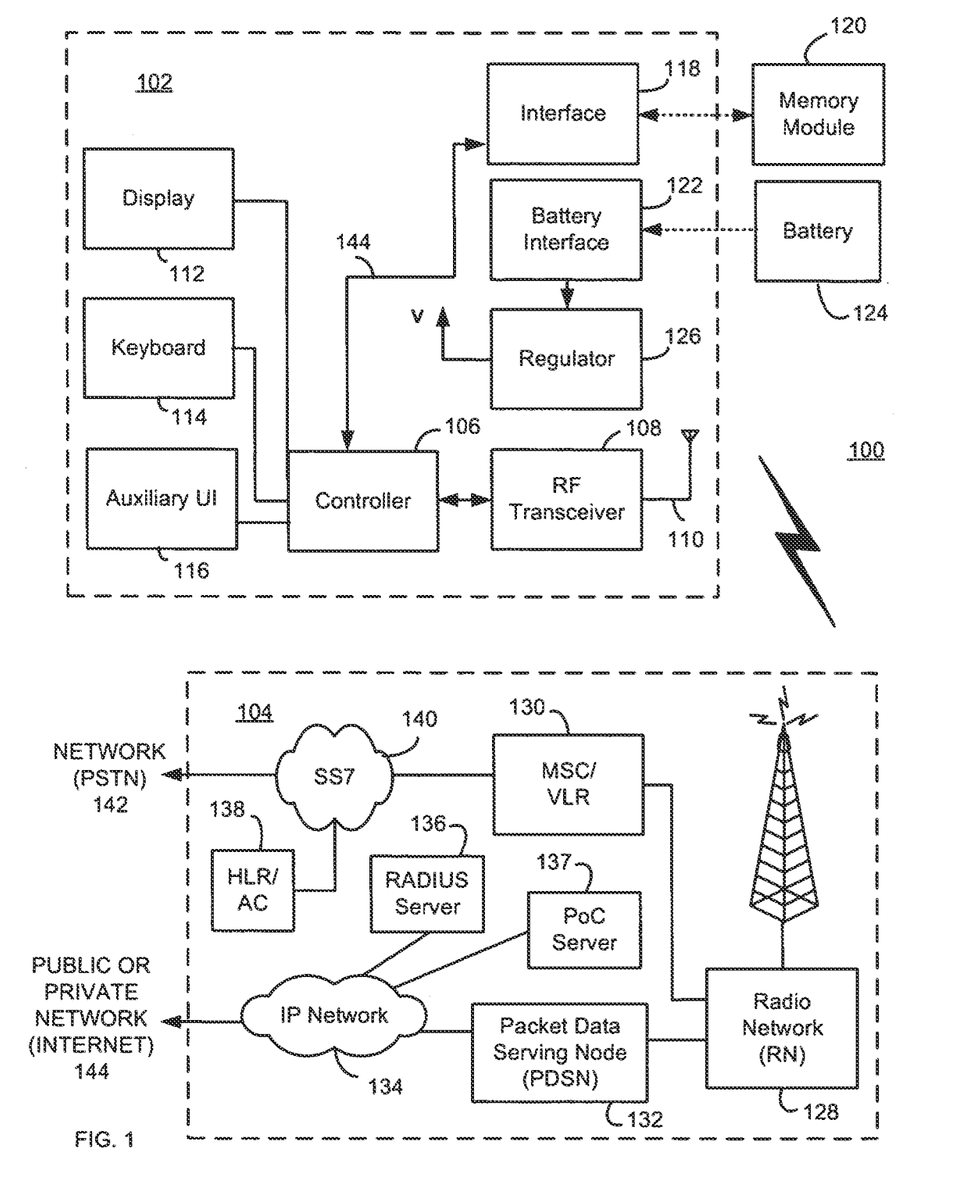
FIG. 1 is a block diagram which illustrates pertinent components of a wireless communication network and a mobile station which communicates within this network, both configured to facilitate Push-to-talk over Cellular (PoC) communications.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
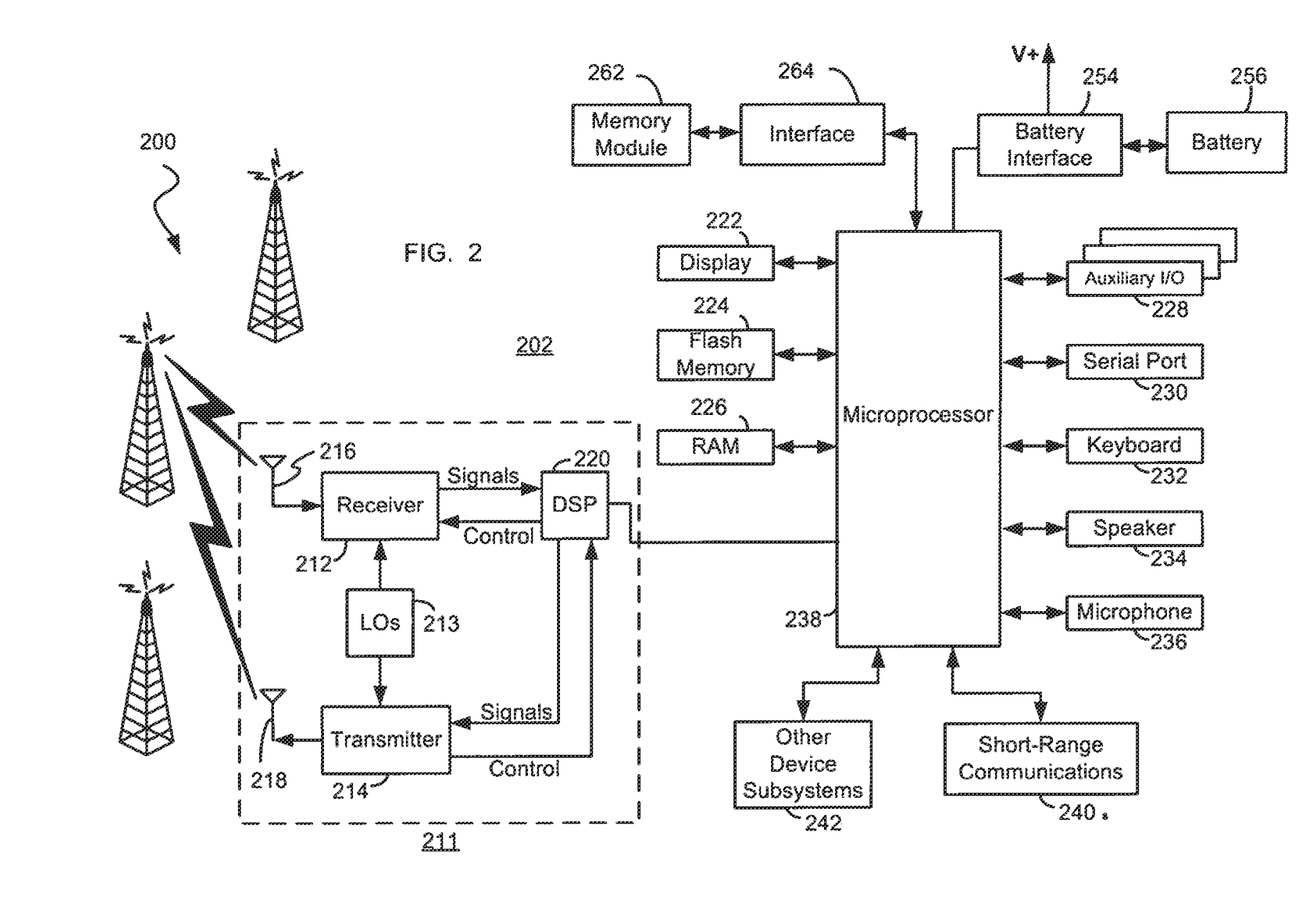
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3A:
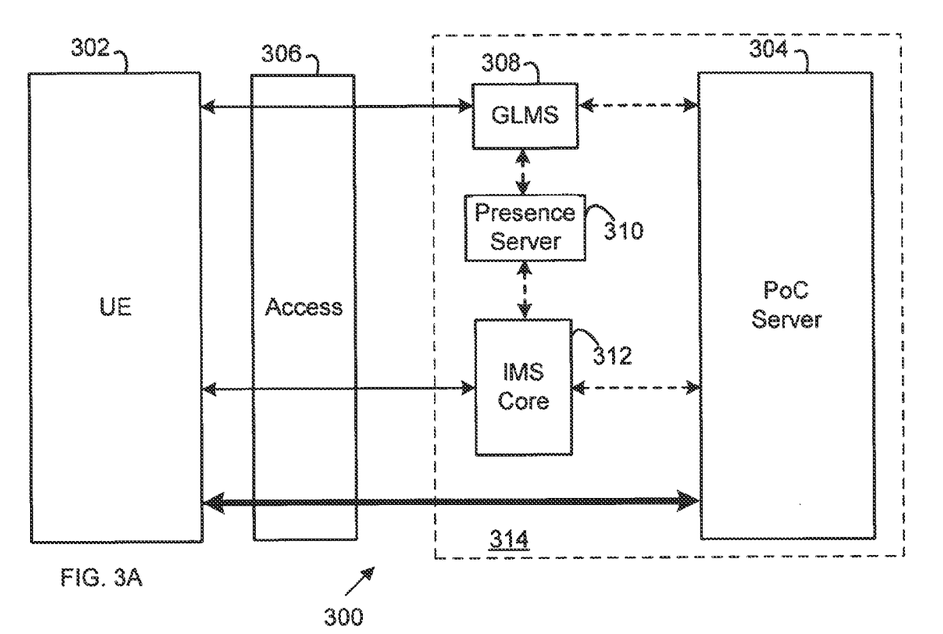
FIGS. 3A and 3B are block diagrams of alternative system component configurations pertaining to PoC communication sessions of the present application.
Figure 3B:
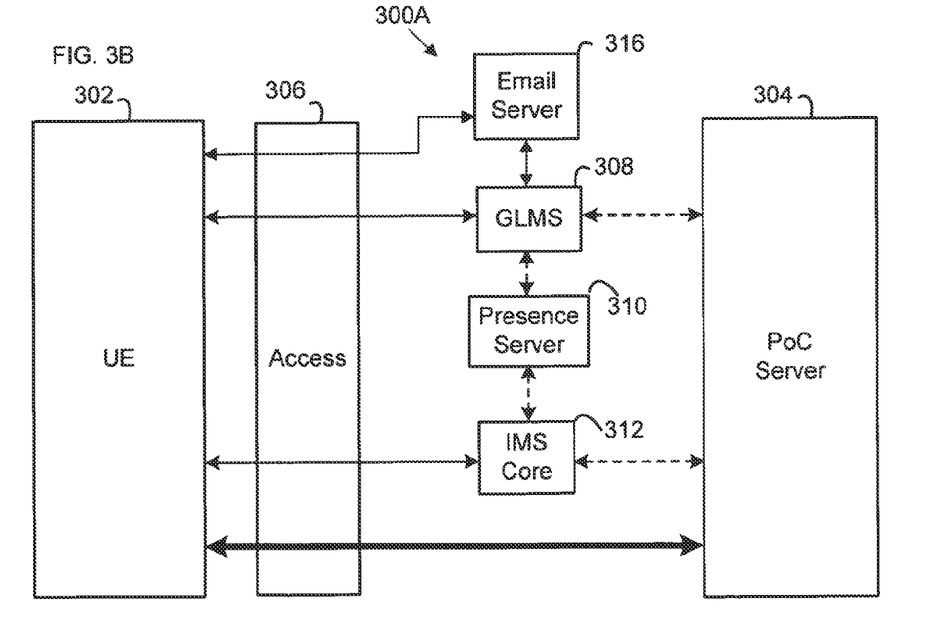

FIGS. 3A and 3B are block diagrams of relevant system components 300 and 300A showing alternative configurations pertaining to PoC communications of the present application. System components 300 include user equipment (UE) 302 which represents a mobile station, a PoC server 304, an access 306, a Group and List Management Server (GLMS) 308, an IP Multimedia Subsystem (IMS) core 312, and a presence server 310. Some of these components may be optional or not necessary for fundamental operation. Though illustrated as individual component devices all of the components 304, 308, 310, and 312, collectively 314 or a subset thereof such as 304, 308, and 310 may be configured within the same device (not shown).

A PoC communication session is a session connection between end users of a UE 302, referred to as session "participants", who communicate one at a time in a half-duplex manner. PoC communication utilizes Voice over IP (VoIP) technology which involves the communication of data packets carrying voice information. UE 302 is terminal equipment (e.g. a mobile station) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups, particularly as described further below with reference to FIGS. 4-6. An end user may select one PoC group from the list to initiate an instant group talk session or a chat group talk session, depending on the type of group.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (10) quality feedback; (11) charging reports; and (12) media distribution. Presence server 310 manages presence information that is uploaded by presence user/network/external agents, and is responsible for combining the presence-related information from the information it receives from multiple sources into a single presence document.

Other than the inventive techniques described herein, the PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification.

With reference to FIG. 3B, system components 300A comprise system components 300 and an email server 316 providing an electronic address book feature including email group lists. Email server 316 is coupled for communication with GLMS 308 and UE 302.

Figure 4:
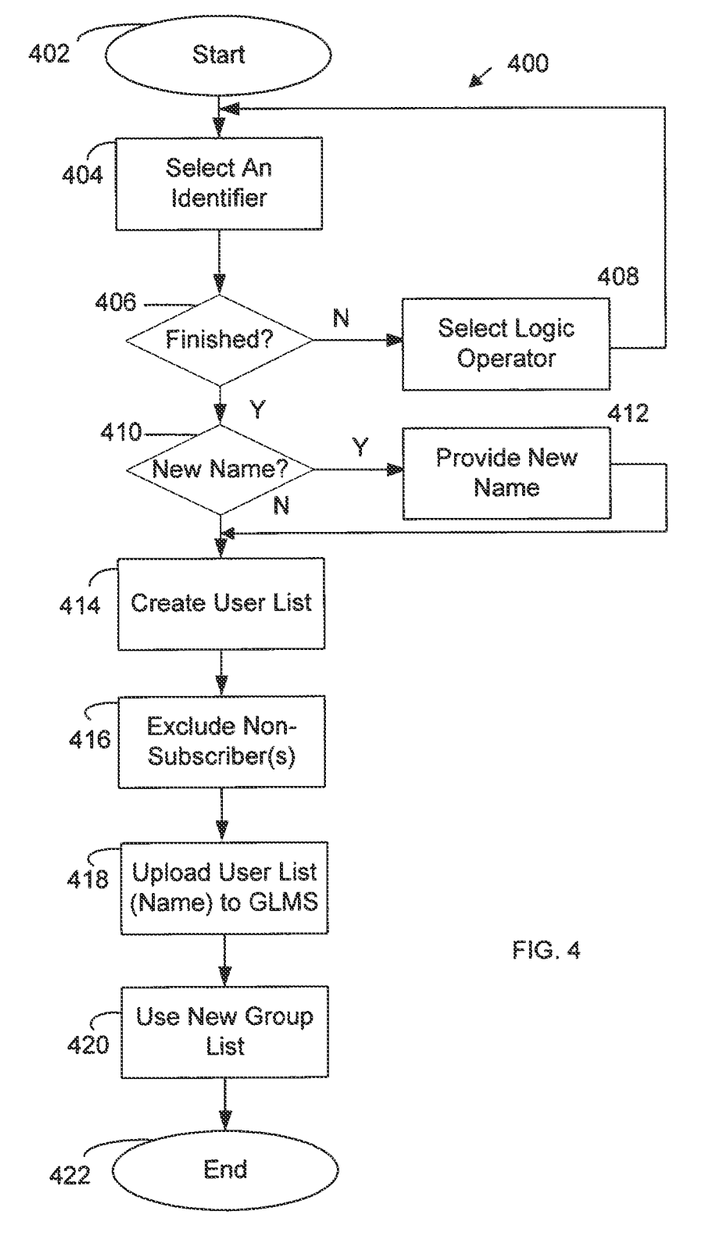
FIG. 4 is flowchart of operations in accordance with a first embodiment of the invention.

Within the context of the architecture above, FIG. 4 is a flowchart which illustrates operations 400 in accordance with a first embodiment of the invention whereby UE 302 is used to define a PoC group, assembling the list of members for the new PoC group at UE 302. The method may be embodied in a computer program product which includes a computer storage medium (e.g. computer disk or memory) and computer instructions stored in the computer storage medium.

Operations 400 start at step 402 and a user using a user interface of UE 302 may define the new PoC group from contacts chosen from one or more address books or other lists coupled to UE 302. A contact may include an individual contact or a contact group or an existing PoC group. At step 404, by way of example, the user selects a contact (an individual contact or an alias for a contact group) using a user interface. At step 406, if the user is not finished defining the new PoC group, logical operators (words or symbols) for combining contacts and existing PoC groups (e.g. AND, OR, +, −, &, |, etc.) are provided such as by inputting or selecting, and operations repeat at step 404.

If the user is finished composing a group definition from which to determine members of the new group at step 406, the user may use the user interface to choose to assign a new name for the new PoC group to be created (steps 410-412) or not. At step 414, a user list determination unit of the mobile station assembles the list of members for the new PoC group. The list of members is assembled from the individual contacts selected, if any, and the individual contacts of the contact groups selected in steps 404-408. If any existing PoC groups are specified, the members of such groups are determined and used to assemble the new list. The list of members is assembled by combining using the logical operators.

The individual contacts for a contact group may be obtained from an electronic address book coupled locally or remotely (e.g. from email server 316) using the communications subsystem of the mobile station. Members of existing PoC groups may be obtained from GLMS 308 (see FIG. 3B). Duplicates members are preferably removed, for example, by the user list determination unit. If a contact group is comprised of one or more other contact groups, each contact group is resolved to its list of individual contacts.

At step 416, those contacts that do not have PoC service capabilities are also excluded. For example, non-subscribers may be eliminated based on an information/attribute portion of an address book contact by the user list determination unit. Alternatively, GLMS 308 may remove non-subscribers when the list of potential members is uploaded to GLMS 208.

The thus assembled list of members and new group name, if available, for the new PoC group is uploaded to the GLMS (step 418). The new PoC group may then be used to make a PoC group call (step 420). Operations end at step 422. The new PoC group can be made available for use by others members of the same new group (not shown). The new PoC group may be maintained in a memory of GLMS 308 for a predetermined period (which may be user configurable) or persisted until removed by user action (not shown) or just for this use. The predetermined period of time may be measured relative to the time of creation of the PoC Group, for example, to maintain such group for a few hours, days, etc. Alternatively, the period of time may be relative to a last use of the PoC Group, whereby the timer is reset upon each use and the group is removed only if the group is not used before the reset timer expires. The embodiment thus described is relatively storage, communication and processing intensive for a UE.

Figure 5:
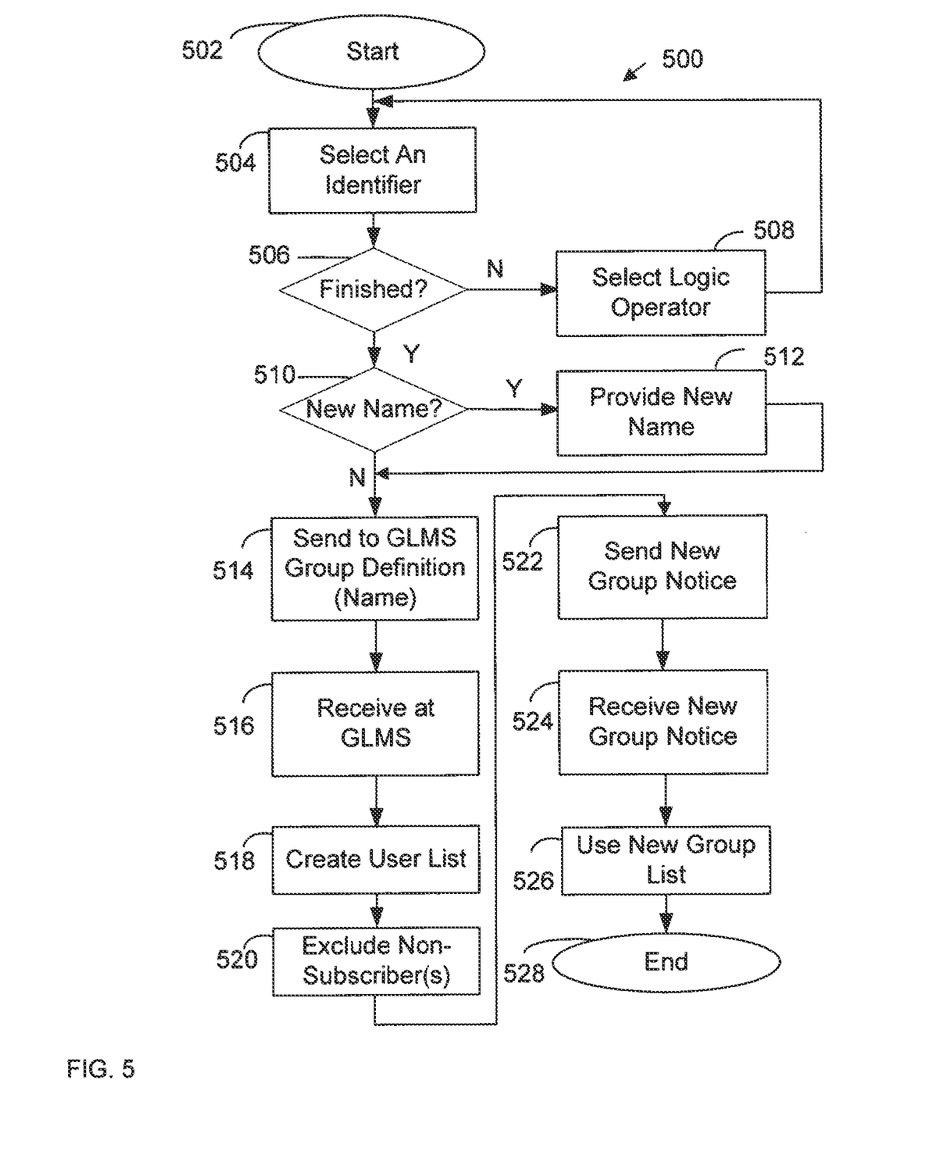
FIG. 5 is flowchart of operations in accordance with a second embodiment of the invention.

FIG. 5 illustrates operations 500 in accordance with a second embodiment of the invention whereby UE 302 of FIG. 3B is used to define a group definition with assembly of the list of members occurring at a user list determination unit of GLMS 308 coupled to UE 302 in accordance with the group definition. The method may be embodied in a computer program product which includes a computer storage medium (e.g. computer disk or memory) and computer instructions stored in the computer storage medium. Operations 500 start at step 502 and a user may compose the new PoC group definition from one or more contacts from one or more electronic address books or other lists coupled to UE 302 using a user interface. At step 504, the user selects an identifier to reference a contact, contact group or PoC group. At step 506, if the user is not finished defining the new PoC group, logical operators for combining same as previously discussed may be provided (e.g. input or selected, at step 508) and operations repeat at step 504.

If the user is finished composing, at step 506, the user may choose to assign a new name for the new PoC group to be created (steps 510-512) or not. At step 514, the group definition for the new PoC group comprising one or more identifiers for the contacts, contact groups and/or PoC groups and any logical operators from which to create the new PoC group and, optionally, a new name are sent (step 514) using the communication subsystem to GLMS 308 and received (step 516).

At step 518, the list of members for the new PoC group is assembled by a user list determination unit at GLMS 308 using the group definition. Individual contacts and lists for contact groups may be obtained from email server 316, from an address book stored locally to GLMS 308, or from UE 302 for a locally defined contact group by the user list determination unit. Duplicates are preferably removed by the GLMS as it assembles the new PoC group list of members. At step 520, those contacts that do not have PoC service capabilities are excluded. The list of members in the new PoC group may be used by the user or other members of the group to make a PoC call. The successful creation of the PoC group is notified to UE 302 (steps 522-524). The list may be maintained in a memory of GLMS 308 for a predetermined period or persisted until removed by user or administrator action as previously described (not shown). Optionally though not shown, the list of the new PoC group members may be made available for review to UE 302. At step 526 the new list is used to make a PoC call by UE 302 and operations end (step 528).

The second embodiment thus described is comparatively less UE storage and processing intensive than the first embodiment.

Figure 6:
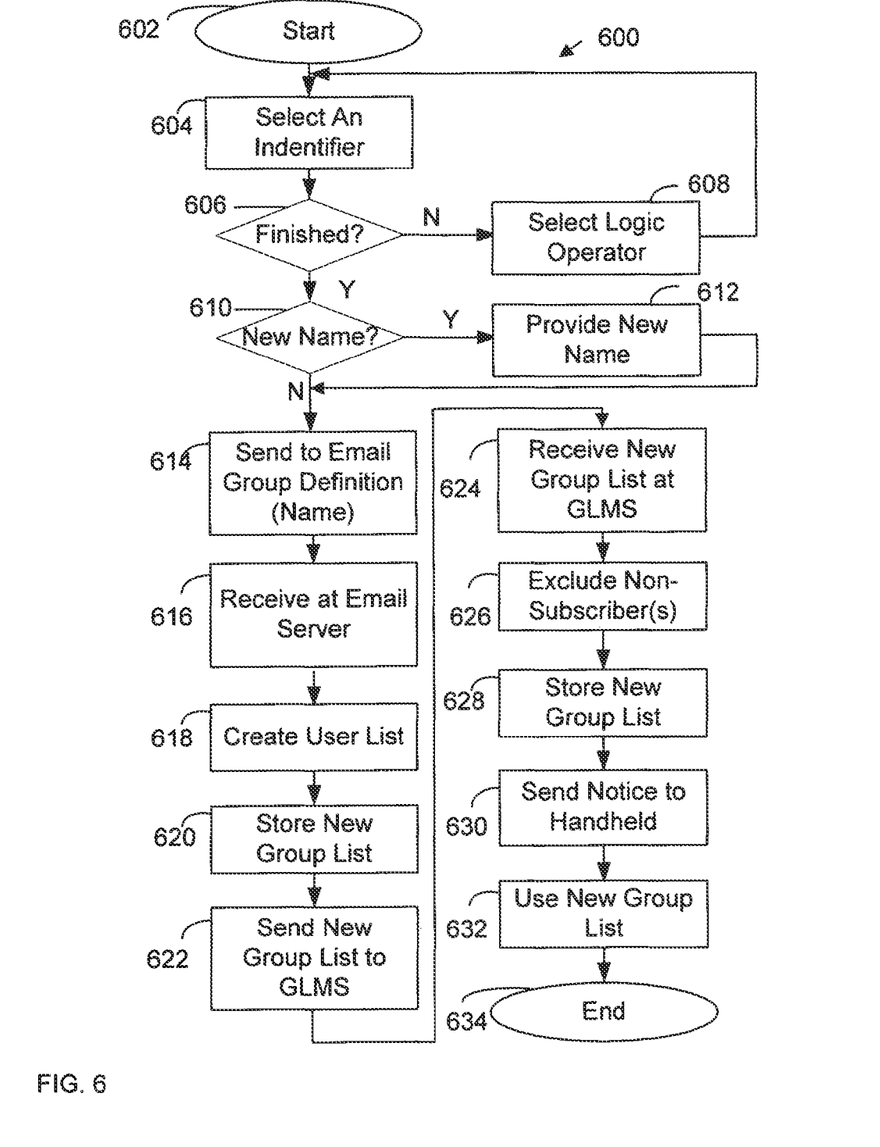
FIG. 6 is flowchart of operations in accordance with a third embodiment of the invention.

FIG. 6 illustrates operations 600 in accordance with a third embodiment of the invention whereby UE 302 of FIG. 3B is used to compose a group definition to determine members of a PoC group, assembling the list of members at email server 316 and GLMS 308 coupled to UE 302. The method may be embodied in a computer program product which includes a computer storage medium (e.g. computer disk or memory) and computer instructions stored in the computer storage medium. Operations 600 start at step 602 and a user using a user interface of the mobile station may compose the new PoC group definition from one or more contacts, contact groups and/or existing PoC groups from one or more electronic address books or PoC group lists coupled to UE 302. Email server 316 having a user list determination unit may query GLMS 308 to get a list of users for a particular PoC group to assemble the new list or email server 316 may resolve address book contact groups for determining a list and send the partial list with the group definition to GLMS 308 for completion. At step 604, the user selects an identifier to reference a contact, a contact group or an existing PoC group. At step 606, if the user is not finished defining the new group, logical operators for combining contacts and PoC groups as previously discussed (step 608) may be provided and operations repeat at step 604.

If the user is finished at step 606, the user may choose to assign a new name for the new PoC group to be created (steps 610-612) or not. At step 614, the definition for the new group comprising one or more identifiers and any logical operations from which to construct the new group and optionally a new name are sent to email server 316 and received (step 616).

At step 618, the list of members for the new PoC group is first assembled by the user list determination unit at email server 316 using the identifiers (e.g. individual contacts and contact groups) selected in steps 604-608. Particulars for the individual contacts selected and to which the selected contact groups resolve may be obtained from an electronic address book coupled remotely or locally to email server 316. Duplicates are preferably removed by the email server 316 as it assembles the group list. At step 620, the list is preferably stored locally, either for a predetermined period of time after the last use, or permanently until the owner or an administrator removes it, and at steps 622-624 uploaded to GLMS 308 for further processing by a PoC Group constructing unit.

At step 626, with the list of members received, those members in the list that do not have PoC service capabilities are excluded by the PoC Group constructing unit of GLMS 308. GLMS may resolve lists of members of any existing PoC Group if not yet resolved by email server 316 using its PoC Group constructing unit. The new list of members is preferably stored locally to the GLMS 308 (step 628). The list of members in the new PoC group may be used by the user or other members of the same new group to make a PoC call. The successful creation is notified to UE 302 and may be used (steps 630-632). The list itself may be provided to UE 302 (not shown) and may be maintained in a memory of GLMS 308 for a predetermined period or persisted to local storage until removed by user (not shown) or just for this use. At step 634 operations end.

Though the example embodiments discuss the defining of a group definition using individual contacts, contact groups, existing PoC groups or combination thereof, persons of ordinary skill in the art will appreciate that embodiments permitting lesser functionality are contemplated. For example, an embodiment may permit composition from only one of (i) contact groups, (ii) individual contacts and (iii) PoC groups. Others may permit certain combinations such as combining only (i) individual contacts and contact groups or (ii) contact groups and PoC groups.

Persons of ordinary skill in the art will further appreciate that in accordance with the techniques disclosed herein the PoC groups defined may be used for facilitating other types of communication among the members of such groups. Email, instant messaging, chat and non-PoC voice calling such as a conference call may be established among the contacts.

The new group can be configured for the purposes of one communication type only, or multiple types. For example, a new group defined with the name "Ottawa Office" can be configured only as an email service group. When a user tries to create a PoC group using "Ottawa Office", the user may get a warning that PoC group creation from this alias is prohibited. Conversely, "Ottawa Hardware" can be configured for both PoC and email. If a user sends an email to "Ottawa Hardware", each member of "Ottawa Hardware" will receive this email. If a user starts a PoC group call to "Ottawa Hardware", each member of "Ottawa Hardware" will be in the PoC group call.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

The invention claimed is:

1. A method of creating a communication group for a given type of communication using a mobile station for initiating communication sessions of the given type among mobile stations, the method comprising:

receiving as input from a user of the mobile station a single logical expression for defining a list of members for the communication group, the single logical expression containing two or more identifiers each associated with one of a contact, contact group, and communication group in an electronic address book, and the single logical expression containing at least one selectable logical operator for logically combining the two or more identifiers; and creating, in one step at call time, the list of members from the respective two or more contacts, contacts groups, or communication groups in the electronic address book in accordance with the single logical expression.

2. The method of claim 1 wherein the given type of communication comprises at least one of electronic mail, instant messaging, chat, and conference calling.

3. The method of claim 1 further including determining information for particular contacts and communication groups identified by said respective identifiers.

4. The method of claim 3 wherein determining said information for a contact comprises obtaining the information from an electronic mail (email) server.

5. The method of claim 1 comprising excluding from said list of members at least one of:
(i) duplicate members; and
(ii) members incapable of communicating by way of the given type of communication.

6. The method of claim 1, further comprising maintaining the list of members in a memory of a communication network server adapted for maintaining communication groups.

7. The method of claim 6 wherein the list of members is maintained for one of:
(i) a predetermined period of time;
(ii) until removal by a user of the list; and
(iii) a single communication session.

8. The method of claim 7 wherein the predetermined period of time is measured relative to the time of creation of the communication group.

9. The method of claim 7 wherein the predetermined period of time is relative to a last use of the communication group, whereby a timer is reset upon each use and the group is removed if the group is not used before the reset timer expires.

10. The method of claim 1 further including receiving a notification of the creation of the communication group at one of the mobile stations.

11. The method of claim 1 further including initiating a communication session using said list of members.

12. The method of claim 11 wherein the communication session is of the given type of communication.

13. The method of claim 1 wherein said steps of receiving and creating are performed by one of said mobile stations.

14. The method of claim 13 further including at least one of:
(i) storing said list of members to a memory of said one of said mobile stations; and
(ii) uploading said list of members to a communication network server adapted to maintain communication groups.

15. The method of claim 1 wherein said creating is performed by a communication network server adapted to maintain communication groups, said server receiving from one of said mobile stations said single logical expression.

16. The method of claim 15 wherein the single logical expression includes at least one identifier, each identifier identifying one of a contact, a contact group, and an existing communication group from an electronic address book of contacts or existing member lists and wherein the method comprises obtaining information for particular contacts from an electronic mail (email) server.

17. The method of claim 1 wherein said creating is performed by an electronic mail (email) server of a communication network, said email server receiving from one of said mobile stations said single logical expression.

18. The method of claim 17 wherein the single logical expression includes at least one identifier, each identifier identifying one of a contact, a contact group, and an existing communication group from an electronic address book of contacts or existing member lists and wherein the method comprises obtaining information for particular contacts from an address book stored on the electronic mail (email) server.

19. The method of claim 18 further including uploading said list of members to a communication network server adapted to maintain communication groups.

20. The method of claim 19 further including excluding from said communication group at least one of:
(i) duplicate members; and
(ii) members incapable of communicating by way of the given type of communication.

21. The method of claim 1 further including initiating a communication of a type other than the given type of communication using the list of members.

22. The method of claim 1 wherein the communication group to be constructed is associated with a name; and wherein the method comprises assigning the name to said communication group.

23. A mobile station for creating a communication group for a given type of communication for initiating communication sessions of the given type, the mobile station comprising:
a user interface for receiving as input from a user of the mobile station a single logical expression for defining a list of members for the communication group, the single logical expression containing two or more identifiers each associated with one of a contact, contact group, and communication group in an electronic address book, and the single logical expression containing at least one selectable logical operator for logically combining the two or more identifiers; and
means for communicating information pertaining to the list of members to a server adapted to enable the communication group, the information being based on the single logical expression for constructing the communication group in one step.

24. The mobile station of claim 23 wherein the given type of communication comprises at least one of electronic mail, instant messaging, chat, and conference calling.

25. The mobile station of claim 23 further including a memory and wherein the communications system receives said list of members for storing to the memory.

26. A mobile station for creating a communication group for a given type of communication for initiating communication sessions of the given type, the mobile station comprising:
a user interface receiving as input from a user of the mobile station a single logical expression for defining a list of members for the communication group, the single logical expression containing two or more identifiers each associated with one of a contact, contact group, and communication group in an electronic address book, and the single logical expression containing at least one selectable logical operator for logically combining the two or more identifiers;
a user list determination module for assembling the list of members in accordance with the single logical expression for constructing the communication group; and
a communications system for communicating information pertaining to the list of members to a server adapted to enable the communication group, the information being based on the single logical expression for constructing the communication group in one step.

27. The mobile station of claim 26 wherein the given type of communication comprises at least one of electronic mail, instant messaging, chat, and conference calling.

28. The mobile station of claim 26 wherein the user list determination module excludes from said list of members at least one of:
   (i) duplicate members; and
   (ii) members incapable of communicating by way of the given type of communication.

29. The mobile station of claim 26 wherein the communications system uploads said list of members to a communication network server adapted to maintain communication groups.

30. A communication network server for constructing a communication group of a given type of communication for initiating communication sessions of the given type among mobile stations, the server comprising:
   means for receiving a single logical expression from a mobile station for defining a list of members for the communication group, the single logical expression containing two or more identifiers each associated with one of a contact, contact group, and communication group in an electronic address book, and the single logical expression containing at least one selectable logical operator for logically combining the two or more identifiers; and
   a user list determination module for creating the list of members in accordance with the single logical expression for constructing the communication group in one step.

31. The communication network server of claim 30 wherein the given type of communication comprises at least one of electronic mail, instant messaging, chat, and conference calling.

32. The communication network server of claim 30 wherein the server comprises an electronic mail (email) server and wherein the means for receiving communicates the list of members in accordance with the single logical expression to a second communication network server for maintaining communication groups to enable group communications.

33. The communication network server of claim 30 further including a communication group construction module for creating the communication group from the list of members to enable communication group communications.

34. The communication network server of claim 33 further including a memory for maintaining the list of members.

35. The communication network server of claim 34 wherein the list of members is maintained for one of:
   (i) a predetermined period of time;
   (ii) removal by a user of the communication group; and
   (iii) a single communication session.

36. The communication network server of claim 35 wherein the predetermined period of time is measured relative to the time of creation of the communication group.

37. The communication network server of claim 35 wherein the predetermined period of time is relative to a last use of the communication group, whereby a timer is reset upon each use and the group is removed if the group is not used before the reset timer expires.

38. The communication network server of claim 30 wherein the communication group to be constructed is associated with a name; and wherein the communication network server assigns the name to said communication group.

* * * * *